US011512662B2

(12) United States Patent
Tanaya

(10) Patent No.: US 11,512,662 B2
(45) Date of Patent: Nov. 29, 2022

(54) INTERNAL-COMBUSTION-ENGINE CONTROLLER

(71) Applicant: Mitsubishi Electric Corporation, Tokyo (JP)

(72) Inventor: Kimihiko Tanaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/384,953

(22) Filed: Jul. 26, 2021

(65) Prior Publication Data
US 2022/0112854 A1    Apr. 14, 2022

(30) Foreign Application Priority Data

Oct. 8, 2020  (JP) .............................. JP2020-170237

(51) Int. Cl.
*F02D 41/22* (2006.01)
*F02P 3/02* (2006.01)
(Continued)

(52) U.S. Cl.
CPC .............. *F02D 41/22* (2013.01); *B60Q 9/00* (2013.01); *F02D 41/009* (2013.01);
(Continued)

(58) Field of Classification Search
CPC ...... F02D 41/22; F02D 41/009; F02D 41/401; F02D 2041/224; F02D 35/021; B60Q 9/00; F02P 3/02; F02P 9/007; G01M 15/102

See application file for complete search history.

(56) References Cited

U.S. PATENT DOCUMENTS 5,987,373 A * 11/1999 Mattson ................ F02D 41/222
                                                              701/111
6,360,587 B1 * 3/2002 Noel ....................... G01L 23/225
                                                              73/35.08
(Continued)

FOREIGN PATENT DOCUMENTS

JP       9-184789 A     7/1997
JP       9-329049 A    12/1997
(Continued)

OTHER PUBLICATIONS

Communication dated Jan. 5, 2022 from the Japanese Patent Office in Application No. 2020-170237, Machine Translation.
(Continued)

*Primary Examiner* — George C Jin
(74) *Attorney, Agent, or Firm* — Sughrue Mion, PLLC; Richard C. Turner

(57) ABSTRACT

The objective is to provide an internal-combustion-engine controller that can diagnose, at low cost and in real time, respective combustion states of a subsidiary-chamber-type internal combustion engine. An internal-combustion-engine controller according to the present disclosure controls an internal combustion engine having a main combustion chamber and a subsidiary combustion chamber from which a combustion gas is injected into the main combustion chamber through an orifice provided between the main combustion chamber and the subsidiary combustion chamber to ignite a fuel-air mixture in the main combustion chamber; the internal-combustion-engine controller includes an ion detector that detects an ion in the in the subsidiary combustion chamber and a diagnosis and control device that controls fuel supply to the internal combustion engine and diagnoses a combustion state in the main com-
(Continued)

bustion chamber or in the subsidiary combustion chamber, based on an amount of an ion detected by the ion detector.

13 Claims, 6 Drawing Sheets

(51) Int. Cl.
F02D 41/00 (2006.01)
F02D 41/40 (2006.01)
G01M 15/10 (2006.01)
B60Q 9/00 (2006.01)

(52) U.S. Cl.
CPC .............. F02D 41/401 (2013.01); F02P 3/02 (2013.01); G01M 15/102 (2013.01); F02D 2041/224 (2013.01)

(56) References Cited

U.S. PATENT DOCUMENTS

| | | | |
|---|---|---|---|
| 10,815,916 B2* | 10/2020 | Badawy | F02D 41/1458 |
| 2009/0043479 A1 | 2/2009 | Noda et al. | |
| 2010/0101533 A1* | 4/2010 | Huschenbett | F02D 41/401 |
| | | | 123/406.19 |
| 2016/0201636 A1 | 7/2016 | Inada et al. | |
| 2020/0309083 A1* | 10/2020 | O'Connor | F02P 15/02 |
| 2022/0003176 A1* | 1/2022 | Leone | H01T 13/462 |

FOREIGN PATENT DOCUMENTS

| | | |
|---|---|---|
| JP | 2005-307945 A | 11/2005 |
| JP | 2009-57958 A | 3/2009 |
| JP | 2009-281161 A | 12/2009 |
| JP | 2016-128653 A | 7/2016 |
| JP | 2017-103179 A | 6/2017 |
| JP | 2021-50724 A | 4/2021 |

OTHER PUBLICATIONS

Office Action dated Oct. 4, 2022 from the Japanese Patent Office in JP Application No. 2020-170237.

* cited by examiner

INTERNAL-COMBUSTION-ENGINE CONTROLLER

BACKGROUND OF THE INVENTION

Field of the Invention

The present disclosure relates to an internal-combustion-engine controller.

Description of the Related Art

As countermeasures for global warming that has been problematized in recent years, world-wide approach to reduce Greenhouse effect gas has started. Because this approach is required also in the automobile industry, development for improving the efficiency of an internal combustion engine is being promoted.

Among internal combustion engines, there exists an internal combustion engine provided with a subsidiary combustion chamber having an orifice at the front end of an ignition plug. A fuel-air mixture is ignited in the subsidiary combustion chamber and then combustion flame is injected through the orifice into a main combustion chamber. The internal combustion engine in which a fuel-air mixture in the main combustion chamber is ignited with the injected combustion flame is referred to as a subsidiary-chamber-type internal combustion engine (for example, Patent Document 1). Because in this method, multi-point ignition can rapidly be applied to the fuel-air mixture in the main combustion chamber, the combustion period can be shortened even with a lean fuel-air mixture; thus, stable operation can be performed. Accordingly, because the thermal efficiency can largely be raised, the method has been drawing attention, as a method in which the exhaust amount of greenhouse effect gas can largely be reduced.

PRIOR ART REFERENCE

Patent Literature

[Patent Document 1] Japanese Patent Application Laid-Open No. 2017-103179

SUMMARY OF THE INVENTION

In a subsidiary-chamber-type internal combustion engine, because the subsidiary combustion chamber is connected with the main combustion chamber though an orifice, there exists a problem in terms of the scavenging performance. Accordingly, when the load is small, burned gas produced by combustion is liable to stagnate in the subsidiary combustion chamber. In addition, at a time of high rotation and a high load, the flow rate of a fuel-air mixture that flows from the main combustion chamber into the subsidiary combustion chamber through the orifice is accelerated during the compression stroke. Accordingly, a park discharge produced between the electrodes of an ignition plug provided in the subsidiary combustion chamber is liable to be blown out. These effects deteriorate the ignitability and hence a misfire may be caused.

A subsidiary-chamber-type internal combustion engine reaches combustion of a fuel-air mixture in the main combustion chamber in accordance with the following procedure. An ignition plug in the subsidiary combustion chamber ignites the fuel-air mixture; combustion flame grows; the pressure in the subsidiary combustion chamber rises; combustion gas is blew into the main combustion chamber through the orifice, so that the fuel-air mixture in the main combustion chamber is ignited. In comparison with an ordinary internal combustion engine, the time during which the combustion flame stagnates in the vicinity of the electrodes of the ignition plug mounted in the subsidiary combustion chamber is long. Accordingly, the temperatures of low-heat-radiation protruding portions such as the insulator portion and the grounding electrode of the ignition plug are liable to become high. There is also posed a problem that preignition, which starts at any of these high-temperature portions, is liable to occur.

In order to solve the foregoing problems, for example, as disclosed in Patent Document 1, the respective shapes of the ignition-plug electrode portions, the inside of the subsidiary combustion chamber, the orifice, and the like and the positional relationship thereamong are being contrived and accurate arrangement thereof is being studied. However, there changes the environment around the ignition plug and the subsidiary combustion chamber, such as various shapes of internal combustion engines, wide-range operation conditions, carbon adhesion to and carbon deposits on the electrodes of the ignition plug, deterioration and consumption of the electrodes, and the like. Accordingly, it is difficult to cope with the problems only by depending on the mechanical structure. It is required to control the internal combustion engine in accordance with the respective states of the inside of the main combustion chamber of the internal combustion engine and the inside of the subsidiary combustion chamber. However, there has been no method with which the state of an ignition plug in the subsidiary combustion chamber, the combustion state in the subsidiary combustion chamber, and the combustion state in the main combustion chamber can be diagnosed at low cost and in real time.

The objective of the present disclosure is to provide an internal-combustion-engine controller that can diagnose, at low cost and in real time, the respective combustion states in the main combustion chamber and in the subsidiary combustion chamber of a subsidiary-chamber-type internal combustion engine.

An internal-combustion-engine controller according to the present disclosure controls an internal combustion engine having a main combustion chamber and a subsidiary combustion chamber from which a combustion gas is injected into the main combustion chamber through an orifice provided between the main combustion chamber and the subsidiary combustion chamber to ignite a fuel-air mixture in the main combustion chamber; the internal-combust on-engine controller includes an ion detection unit that detects an ion in the in the subsidiary combustion chamber and a diagnosis and control device that controls fuel supply to the internal combustion engine and diagnoses a combustion state in the main combustion chamber or in the subsidiary combustion chamber, based on an amount of an ion detected by the ion detection unit.

In a subsidiary-chamber-type internal combustion engine, the internal-combustion-engine controller according to the present disclosure can diagnose, at low cost and in real time, a combustion state in the main combustion chamber or a combustion state in the subsidiary combustion chamber, based on an ion detection amount in the subsidiary combustion chamber; therefore, the problem in the internal combustion engine can early be comprehended and hence the reliability of the internal combustion engine can be raised.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, a controller 1 of an internal combustion engine 100 according to the present disclosure will be explained with reference to the drawings.

1. Embodiment 1

<Configuration of Internal Combustion Engine>

Figure 1:
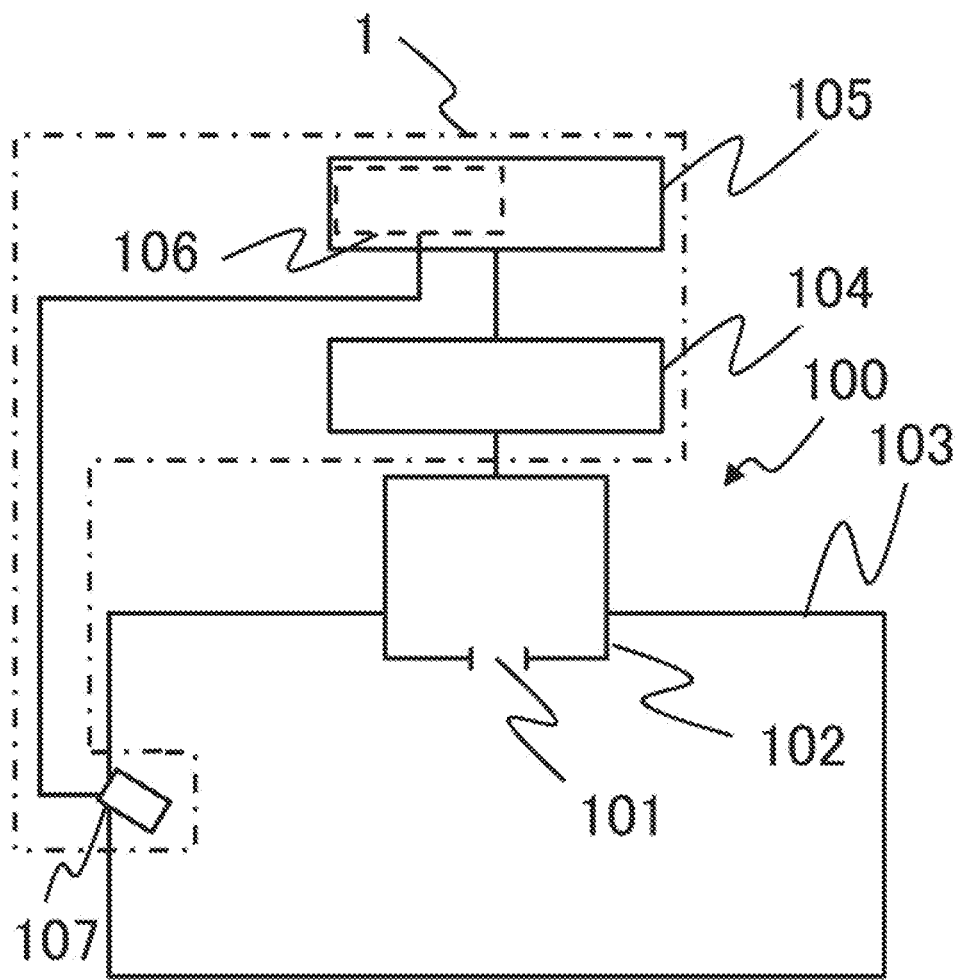
FIG. 1 is a first configuration diagram of an internal combustion engine according to Embodiment 1.

FIG. 1 first configuration diagram of the internal combustion engine 100 according to Embodiment 1 and is a simplified conceptual diagram. The internal combustion engine 100 has a main combustion chamber 103, a subsidiary combustion chamber 102, and an orifice 101 that makes the main combustion chamber 103 and the subsidiary combustion chamber 102 communicate with each other. The controller 1 of the internal combustion engine 100 (hereinafter, referred to only as the controller 1) is provided with an ion detector 104, a diagnosis and control device 105, and a control device 106. The main combustion chamber 103 has an intake port communicating with an intake pipe, an exhaust port communicating with an exhaust pipe, and a movable piston that is connected with a rod coupled with a crankshaft and produces an output; however, in FIG. 1, the descriptions therefor are omitted. An ignitor is disposed in the subsidiary combustion chamber; however, in FIG. 1, the description therefor is omitted.

The control device 106 controls an injector 107 so as to control the fuel supply amount for the main combustion chamber and the fuel supply timing. Air is supplied to the main combustion chamber through the intake port. A fuel injected into the main combustion chamber is mixed with air to become a fuel-air mixture, and then is supplied from the main combustion chamber 103 to the subsidiary combustion chamber 102 through the orifice 101. In the present embodiment, the injector 107 is disposed in the main combustion chamber; however, it may be allowed that the injector 107 is provided in the intake pipe or in the intake port.

The fuel-air mixture in the subsidiary combustion chamber 102 is ignited in the ignitor; combustion flame grows in the subsidiary combustion chamber 102; then, the pressure in the subsidiary combustion chamber rises. After that, high-temperature combustion gas is blew into the main combustion chamber through the orifice, so that the fuel-air mixture in the main combustion chamber is ignited. Accordingly, ignition of the fuel-air mixture in the main combustion chamber is facilitated and hence it is made possible that a lean fuel-air mixture stably combusts. The controller 1 can contribute to improvement of the thermal efficiency of the internal combustion engine 100 by expanding a lean-fuel area.

The ion detector 104 for detecting an ion in the subsidiary combustion chamber 102 transmits a detected ion detection amount to the diagnosis and control device 105. In accordance with the operation condition of the internal combustion engine 100, the diagnosis and control device 105 can diagnose the respective combustion states in the subsidiary combustion chamber 102 and in the main combustion chamber 103 based on the ion detection amount. The diagnosis and control device 105 can diagnose, at low cost and in real time, a misfire state, preignition, and abnormal combustion in each of the subsidiary combustion chamber 102 and the main combustion chamber 103. The diagnosis and control device 105 makes it possible to detect an abnormality in the combustion state of the internal combustion engine 100 at an early stage; therefore, the reliability can be raised, while a lean fuel-air mixture in the internal combustion engine 100 can stably combust. The control device 106 may control the ignitor. In addition, in FIG. 1, there is described the case where the diagnosis and control device 105 includes the control device 106; thus, the control of the injector 107 and the ignitor by the control device 106 is also the control by the diagnosis and control device 105. It may be allowed that the diagnosis and control device 105 and the control device 106 are separated from each other and collaborate with each other while the diagnosis and the control are separately performed.

<Hardware Configuration of Diagnosis and Control Device>

Figure 2:
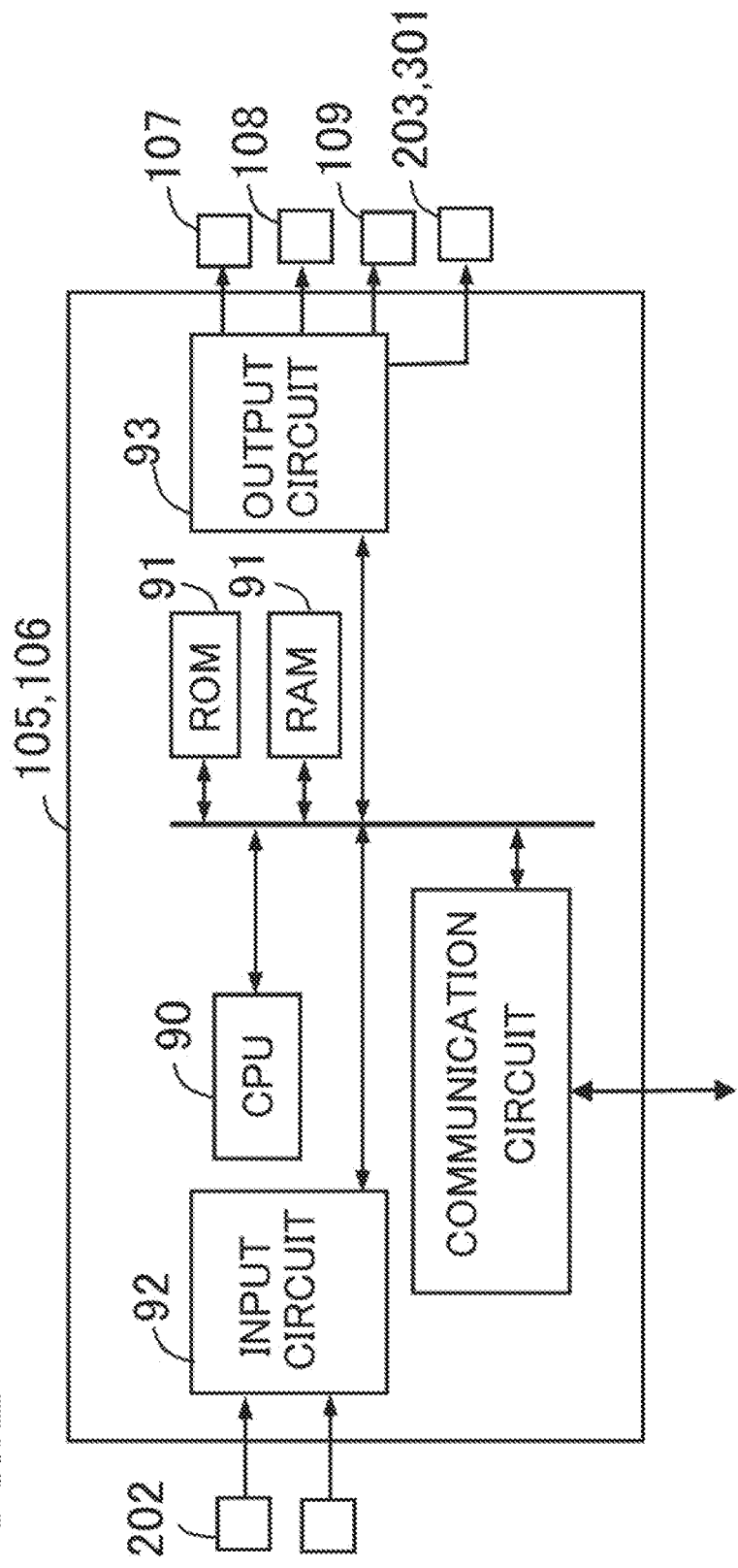
FIG. 2 is a hardware configuration diagram of a diagnosis and control device according to Embodiment 1.

FIG. 2 is a hardware configuration diagram of the diagnosis and control device 105. The explanation in FIG. 2 can be applied to the diagnosis and control device 105 and the control device 106; however, in the following explanation, the diagnosis and control device 105 will be explained as a representative. In the present embodiment, the diagnosis and control device 105 is a control device for diagnosing and controlling a vehicle. Respective functions of the diagnosis and control device 105 are realized by processing circuits provided in the diagnosis and control device 105. Specifically, the diagnosis and control device 105 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are implemented in a sharing manner. As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with various kinds of sensors, including a power source 202, that output ion detection values, switches, and communication lines and is provided with an A/D converter, a communication circuit, and the like for inputting output signals from the sensors and switches and communication information to the computing processing unit 90. The output circuit 93 is provided with a driving circuit and the like for outputting control signals from the computing processing unit 90 to driving apparatuses including the injector 107, an actuator 106, a warning lamp 109, and ignitors 203 and 301.

The computing processing unit 90 runs software items (programs) stored in the storage apparatus 91 such as a ROM and the like and collaborates with other hardware devices in the diagnosis and control device 105, such as the storage apparatus 91, the input circuit 92, and the output circuit 93, so that the respective functions provided in the diagnosis and control device 105 are realized. Setting data items such as a threshold value and a determination value to be utilized in the diagnosis and control device 105 are stored, as part of software items (programs), in the storage apparatus 91 such as a RCM. It may be allowed that the respective functions included in the diagnosis and control device 105 are configured either software modules or combinations of software and hardware.

<Misfire>

In the internal combustion engine 100, there exists a phenomenon in which a fuel-air mixture neither catches nor combust. This phenomenon is referred to as a misfire. There exists a case where supply of a fuel is cut off and hence no combustion occurs in the main combustion chamber 103, and a misfire occurs also in this case; however, in many cases, this phenomenon is referred to as a fuel cut. Moreover, in some cases, a too rich or a too lean fuel-air mixture makes combustion unstable and leads it to a misfire.

In the subsidiary-chamber-type internal combustion engine 100, because the subsidiary combustion chamber 102 is connected with the main combustion chamber 103 though the orifice 101, there exists a problem in terms of the scavenging performance. Burned gas produced by combustion is not exhausted and is liable to stagnate in the subsidiary combustion chamber 102. Accordingly, especially at a time of a low load, because of being pushed back by stagnant burned gas in the subsidiary combustion chamber 102, a fresh fuel-air mixture may not sufficiently be supplied to the subsidiary combustion chamber 102 during a new intake stroke or compression stroke. In this case, residual burned gas (nonflammable gas) in the subsidiary combustion chamber 102 may raise the self-EGR ratio, deteriorate the ignitability, and cause a misfire. In addition, at a time of high rotation and a high load, the flow rate of a fuel-air mixture that flows from the main combustion chamber into the subsidiary combustion chamber through the orifice is accelerated during the compression stroke. Accordingly, a spark discharge produced between the electrodes of the ignition plug provided in the subsidiary combustion chamber is liable to be blown out. It is conceivable that this state causes not only deterioration of the ignition performance of the ignition plug bus also a misfire state.

Staining and damaging caused by carbon adhesion to and carbon deposits on the electrodes of the ignition plug deteriorate the ignition performance. The ignition performance of the electrodes of the ignition plug may fall due to aging deterioration or exhaustion. The effects of these problems may deteriorate the ignitability and then cause a misfire.

When any of these misfires occurs, the output of the internal combustion engine 100 is reduced. Concurrently, any of these misfires causes the environment to be deteriorated by discharging an unburned fuel-air mixture. Moreover, because when starting to combust during the exhaust stroke, an unburned fuel-air mixture may combust in the exhaust pipe or in the catalyst, a misfire may become a cause of damage to the internal combustion engine 100. Therefore, it is important to early diagnose a misfire state that has occurred in the internal combustion engine 100. An early diagnosis makes it possible to notify an operator of the misfire, for example, by lighting the warning lamp 109. As a result, because repair can be done at an early stage, the damage can be limited to a minimum. Moreover, it can be prevented beforehand that a problem is caused by a decrease in the output during travel or by becoming unable to travel.

Furthermore, it is effective that a misfire state is diagnosed and then control items for increasing the load on the engine, increasing the fuel-supply amount, angle-advancing the fuel-supply timing, and the like are performed so that the misfire state is corrected to a normal combustion state. A smolder caused by adhesion of carbon to the electrodes of the ignition plug may be improved when normal combustion continues and hence the electrodes of the ignition plug are purified.

<Ion Detector>

Figure 3:
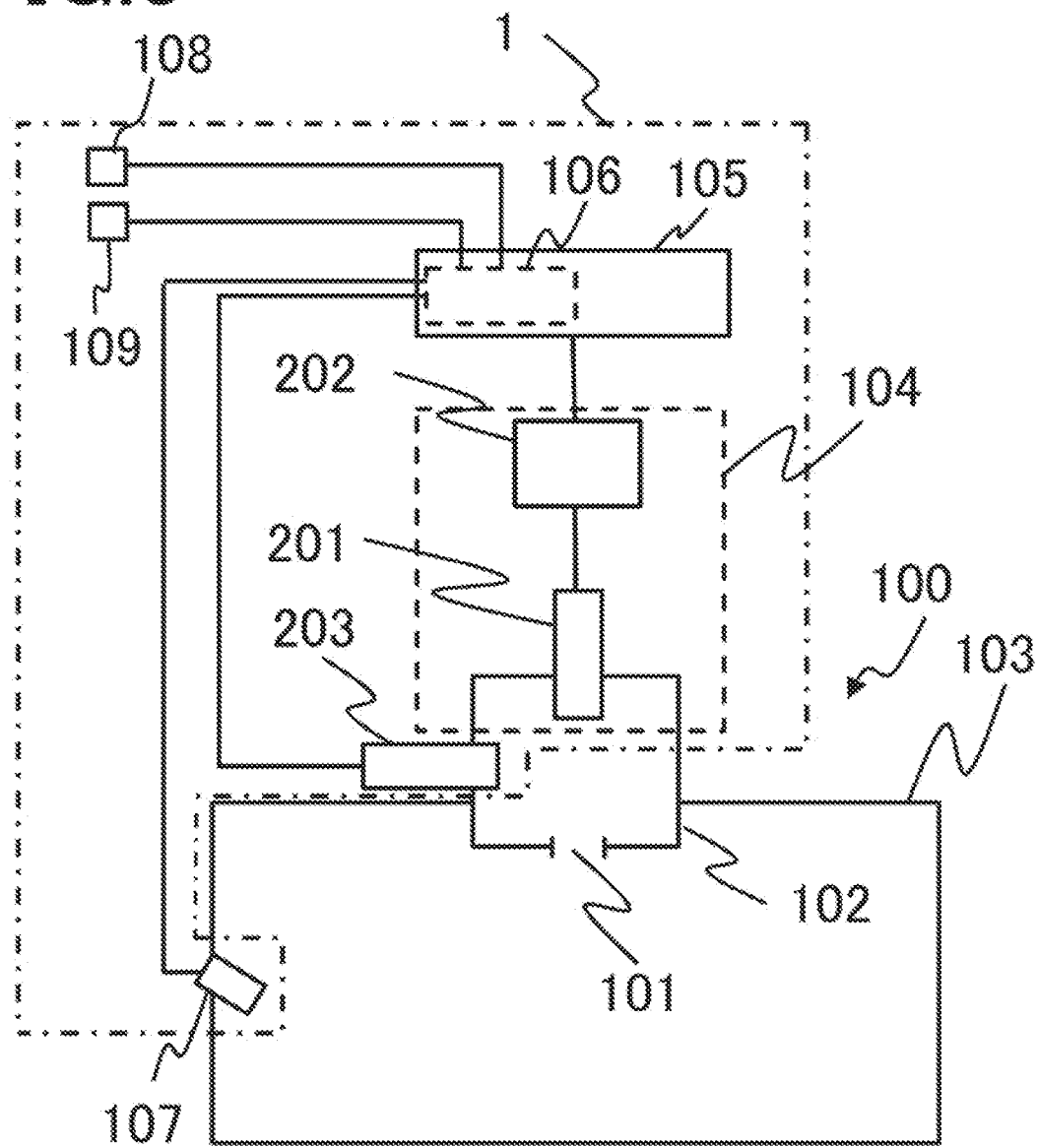
FIG. 3 is a second configuration diagram of the internal combustion engine according to Embodiment 1.

A specific example of the ion detector 104 will be explained by use of FIGS. 3 and 4. FIG. 3 is a second configuration diagram of the internal combustion engine 100 according to Embodiment 1. A detection probe 201 and the power source 202, which are constituent elements of the ion detector 104, are additionally described in the configuration diagram in FIG. 1. The ignitor 203 is additionally described in the subsidiary combustion chamber 102. Each of them is a constituent element omitted in the configuration diagram in FIG. 1.

The detection probe 201 disposed in the subsidiary combustion chamber 102 can detect an ion in the subsidiary combustion chamber, when a voltage is applied thereto. The power source 202 supplies the detection probe 201 with a voltage with which the detection probe 201 detects an ion. In addition, the power source 202 has a function as an amplifier that outputs a signal corresponding to the ion detection amount detected by the detection probe.

The ignitor 203 is provided with a function of igniting a fuel-air mixture in the subsidiary combustion chamber 102. The diagnosis and control device 105 drives the ignitor 203 so as to control the ignition timing. The control device 105 controls the injector 107 so as to control the fuel supply amount for the main combustion chamber 103 and the fuel supply timing. The diagnosis and control device 105 controls the actuator 108 so as to control the throttle-valve opening degree; thus, the load on the internal combustion engine 100 can be controlled by controlling the amount of air to be supplied to the internal combustion engine 100. In the present embodiment, the injector 107 is disposed in the main combustion chamber; however, it may be allowed that the injector 107 is provided in the intake pipe or in the intake port. The diagnosis and control device 105 controls lighting or extinction of the warning lamp 109 for notifying the driver of an abnormality.

In the internal combustion engine 100 in FIG. 3, the detection probe 201, the power source 202, and the ignitor 203 are arranged separately from one another. In addition, there is described the case where the diagnosis and control device 105 includes the control device 106; however, it may be allowed that the control device 106 and the diagnosis and control device 105 are separated from and collaborate with each other. The controller 1 includes the constituent elements indicated by the broken lines.

<Ion Detection Amount>

An ion exists in flame. Because when electrodes are arranged in flame and a voltage is applied thereto, an ion current flows, the existence of the ion can be detected. The explanation will be made while referring the magnitude of the detected ion current as an ion detection amount. Based on the ion detection amount, the combustion state of a fuel-air mixture in the combustion chamber can be diagnosed.

The ion detection amount becomes large, for example, during an ignition initial period during a combustion expansion period in which combustion expands from the subsidiary combustion chamber 102 to the main combustion chamber 103. The ion detection amount changes also depending on the speed of an air flow in the combustion chamber, the combustion speed of a fuel-air mixture, and the temperature of the outer wall of the combustion chamber. An expensive inner-cylinder pressure sensor, an accurate angular-velocity sensor, a combustion analysis apparatus utilizing a laser beam, and the like are mounted in the internal combustion engine 100 disposed in a laboratory, and the respective measurements obtained by these apparatuses are utilized in a combined manner, so that through experiment, the relationship between the combustion state in the combustion chamber and the ion detection amount can be ascertained by changing the operation condition of the internal combustion engine 100. A normal combustion state, a misfire state, a preignition, and an abnormal combustion state are caused to occur, so that the relationship between the combustion state and the ion detection amount can be ascertained. These relationships are specified for respective operation conditions of the internal combustion engine 100, so that the combustion state can be diagnosed based on the magnitude of the ion detection amount.

Figure 4:
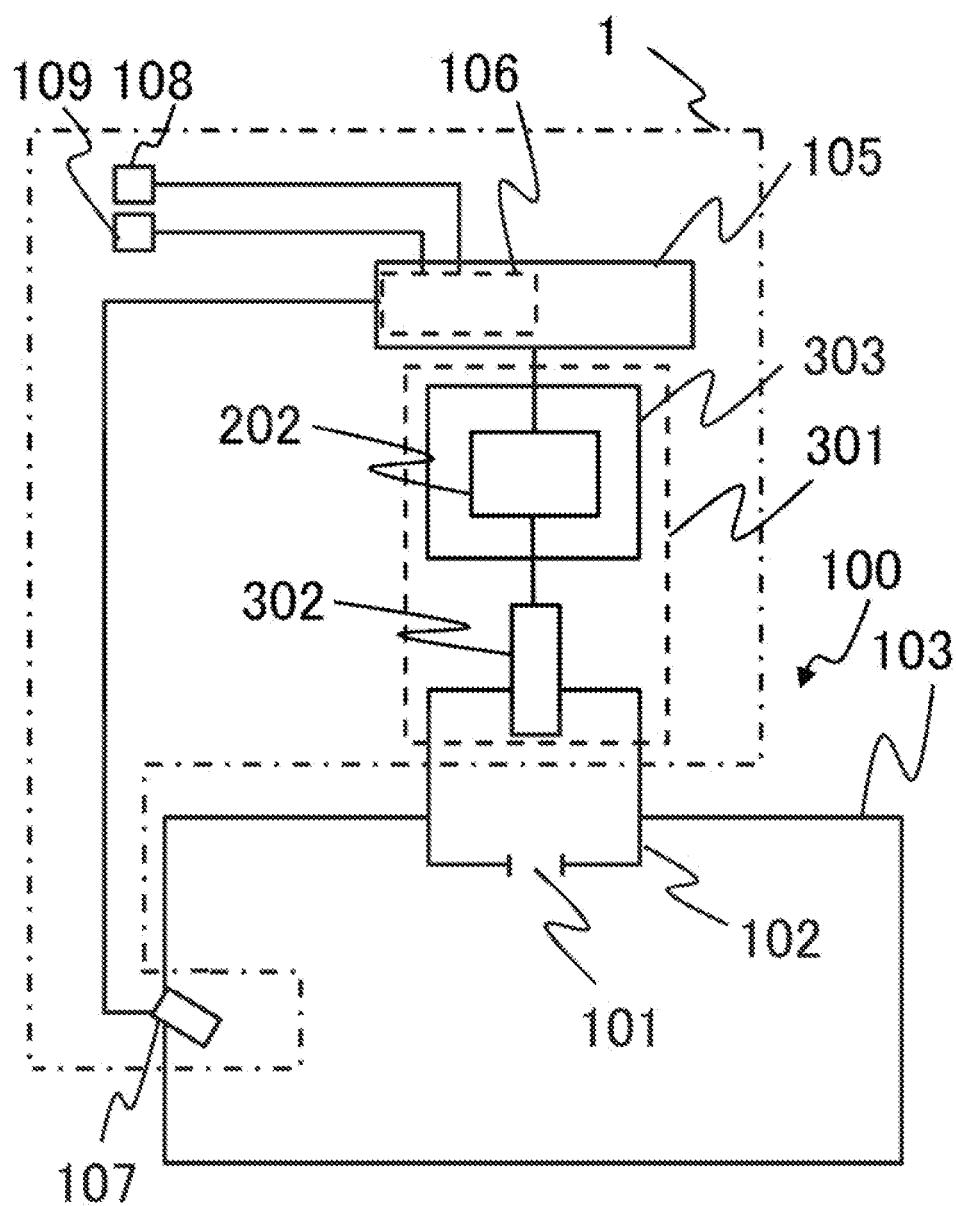
FIG. 4 is a third configuration diagram of the internal combustion engine according to Embodiment 1.

FIG. 4 is a third configuration diagram of the internal combustion engine 100 according to Embodiment 1. In FIG. 4, an ignitor 301 for causing combustion in the subsidiary combustion chamber 102 is provided with an ignition plug 302 and an ignition coil 303. The ignition plug 302 causes an ignition spark to occur between an electrode to which a high voltage is transmitted and an electrode grounded to the earth. The ignition coil 303 supplies a high voltage to the ignition plug 302. Then, the ignition plug 302 is made to play also the role of the detection probe 201, which is a constituent element of the ion detector 104, and the power source 202 is disposed in the ignition coil 303. Furthermore, the diagnosis and control device 105 includes the control device 106 and has the function of the control device 106. The controller 1 includes the constituent elements indicated by the broken lines.

The diagnosis and control device 105 drives the ignitor 301 so as to control the ignition timing. The diagnosis and control device 105 drives the injector 107 so as to control the fuel supply amount for the main combustion chamber 103 and the fuel supply timing. The diagnosis and control device 105 controls the actuator 108 so as to control the throttle-valve opening degree; thus, the load on the internal combustion engine 100 can be controlled by controlling the amount of air to be supplied to the internal combustion engine 100. In the present embodiment, the injector 107 is disposed in the main combustion chamber; however, it may be allowed that the injector 107 is provided in the intake pipe or in the intake port. The diagnosis and control device 105 controls lighting or extinction of the warning lamp 109 for notifying the driver of an abnormality.

Neither a change in the arrangement of these constituent elements nor integration of the functions brings about any essential change in each of the internal combustion engine 100 and the controller 1; therefore, the reference numerals 100 and 1 are utilized for the internal combustion engine and the controller, respectively. Hereinafter, diagnosis and control by the diagnosis and control device 105 will be explained. In the case where the diagnosis and control device 105 and the control device 106 are separated from each other and the diagnosis and the control are separately performed, the explanations therefor will be omitted. The contents that are cooperatively performed by the diagnosis and control device 105 and the control device 106 that are arranged separately from each other are the same as the contents that are performed by the integrated diagnosis and control device 105.

In the controller 1 of the internal combustion engine 100 in FIG. 4, for the sake of simplicity and cost reduction of the system, the power source 202 is disposed in the ignition coil 303 so that a voltage for detecting an ion is made by utilizing part of energy produced by the ignition coil 303. However, it may be allowed that as represented in FIG. 3, the power source 202 is disposed separately from the ignitor 203 so as to raise the detecting accuracy for the ion detection amount.

<Diagnosis of Misfire State>

Figure 5:
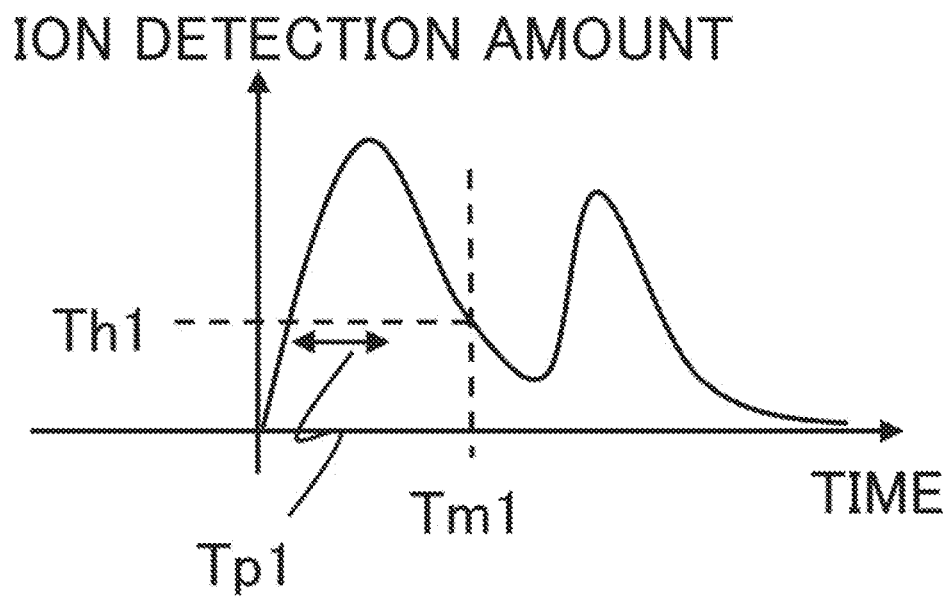
FIG. 5 is a drawing for explaining diagnosis of a combustion state in a subsidiary combustion chamber according to Embodiment 1.
Figure 6:
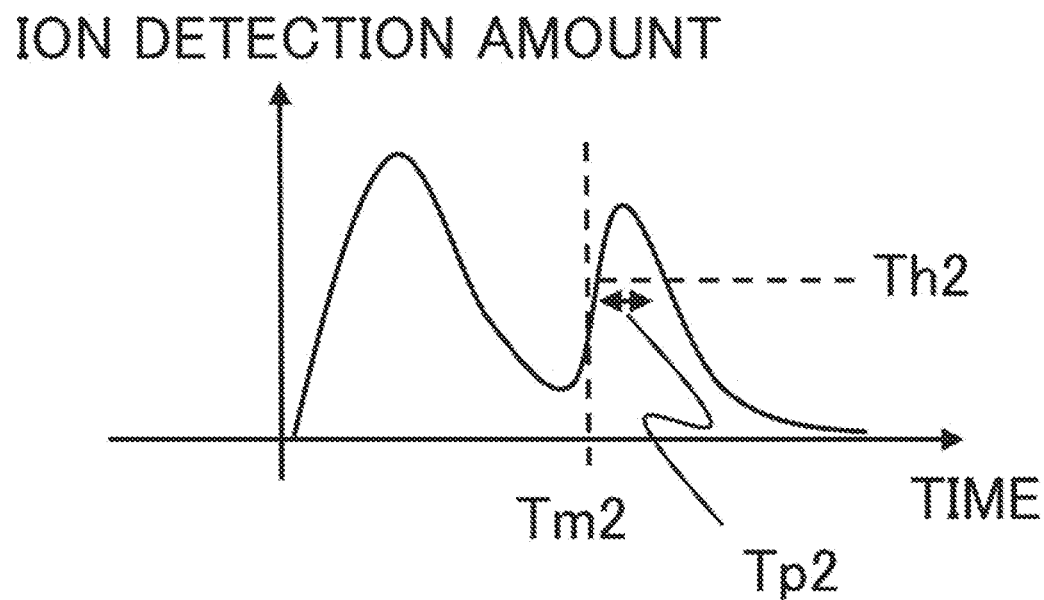
FIG. 6 is a drawing for explaining diagnosis of a combustion state in a main combustion chamber according to Embodiment 1.

FIGS. 5 and 6 are drawings for explaining diagnoses of respective combustion states in the subsidiary combustion chamber 102 and the main combustion chamber 103 according to Embodiment 1. In each of FIGS. 5 and 6, the ordinate denotes the ion detection amount, and the abscissa denotes the time. In order to represent the development of the combustion process, the abscissa may be the crank angle instead of the time. In the following explanation, the abscissa is the time; however, the explanation is established even when the time is replaced by the crank angle.

The power source 202 outputs an ion detection amount having a waveform represented in FIG. 5 to the diagnosis and control device 105. Based on the waveform of the ion detection amount in the internal combustion engine 100, the diagnosis and control device 105 diagnoses whether any one of or both of the subsidiary combustion chamber 102 and the main combustion chamber 103 are in a combustion state or in a misfire state. The diagnosis and control device 105 diagnoses the combustion state for each combustion stroke, based on the ion detection amount.

In the present embodiment, the diagnosis for each combustion stroke signifies the diagnosis performed by detecting the ion detection amount at respective time points before and after the timing of the compression stroke, the expansion stroke, or the exhaust stroke in which a combustion state should intrinsically occur. That is to say, in the four-cycle internal combustion engine 100, a single diagnosis is performed every two rotations of the crankshaft. When the operation condition changes, the ignition timing changes; when the operation condition is specified, the ignition timing is fixed. There can be experimentally ascertained the transition of the ion detection value for each operation condition at a time when the combustion state is normal in each of the subsidiary combustion chamber 102 and the main combustion chamber 103. There can be experimentally ascertained the transition of the ion detection value for each operation condition at a time of a misfire state in each of the subsidiary combustion chamber 102 and the main combustion chamber 103. Respective parameters for diagnosing a misfire state can preliminarily be determined from these experimental results.

<Misfire Diagnosis in Subsidiary Combustion Chamber>

As represented in FIG. 5, in accordance with the operation condition, the diagnosis and control device 105 sets a first combustion detection timing Tm1, a first combustion determination threshold value Th1, and a first combustion determination period Tp1. It may be allowed that as the operation condition, an engine rotation speed, an engine load, a cooling-water temperature, a fuel octane value, or the like is utilized. The diagnosis and control device 105 sets the first combustion detection timing Tm1, the first combustion determination threshold value Th1, and the first combustion determination period Tp1 corresponding to the operation condition, by referring to a table or a map preliminarily stored in the storage apparatus 91 or by use of calculation formulas.

In the case where within a predetermined operation-condition range, the period in which the ion detection amount continuously becomes larger than the first combustion determination threshold value Th1 at a timing temporarily earlier than the first combustion detection timing Tm1 is longer than the first combustion determination period Tp1, the diagnosis and control device 105 diagnoses that a combustion state has occurred in the subsidiary combustion chamber 102. In the case where this procedure does not make it possible to diagnose the occurrence of a combustion state, the diagnosis and control device 105 diagnoses that a misfire state has occurred in the subsidiary combustion chamber 102.

The graph represented by the solid line in FIG. 5 shows an example of the transition of the ion detection amount within the foregoing operation-condition range at a time when a normal combustion state has occurred. The peak indicating the first local maximum value of the ion detection amount is caused by a combustion state at a time when the ignition plug 302 ignites a fuel-air mixture in the subsidiary combustion chamber 102. In the case where ignition fails and hence a misfire state occurs due to excessive leaning of the fuel, staining, damaging, and consumption of the ignition plug 302, or the like, the first peak of the ion detection amount does not occur. In the case of a misfire state, the foregoing period in which the ion detection amount becomes larger than the first combustion determination threshold value Th1 at a timing earlier than the first combustion detection timing Tm1 does not become longer than the first combustion determination period Tp1; thus, the diagnosis and control device 105 cannot diagnose the occurrence of a combustion state. In this case, the diagnosis and control device 105 diagnoses that the subsidiary combustion chamber 102 is in a misfire state.

<Misfire Diagnosis in Main Combustion Chamber>

As represented in FIG. 6, in accordance with the operation condition, the diagnosis and control device 105 sets a second combustion detection timing Tm2, a second combustion determination threshold value Th2, and a second combustion determination period Tp2. It may be allowed that as the operation condition, an engine rotation speed, an engine load, a cooling-water temperature, a fuel octane value, or the like is utilized. The diagnosis and control device 105 sets the second combustion detection timing Tm2, the second combustion determination threshold value Th2, and the second combustion determination period Tp2 corresponding to the operation condition, by referring to a table or a map preliminarily stored in the storage apparatus 91 or by use of calculation formulas.

In the case where within a predetermined operation-condition range, the period in which the ion detection amount continuously becomes larger than the second combustion determination threshold value Th2 at a timing temporarily later than the second combustion detection timing Tm2 is longer than the second combustion determination period Tp2, the diagnosis and control device 105 diagnoses that a combustion state has occurred in the main combustion chamber 103. In the case where this procedure does not make it possible to diagnose the occurrence of a combustion state, the diagnosis and control device 105 diagnoses that a misfire state has occurred in the main combustion chamber 103.

The graph represented by the solid line in FIG. 6 shows an example of the transition of the ion detection amount within the foregoing operation-condition range at a time when a normal combustion state has occurred. The peak indicating the second local maximum value of the ion detection amount is caused by a combustion state in a combustion expansion period in which combustion expands from the subsidiary combustion chamber 102 to the main combustion chamber 103. In the case where ignition fails in the subsidiary combustion chamber 102 or combustion fails to expand to the main combustion chamber 103 and hence a misfire state occurs, the second peak of the ion detection amount does not occur. In the case of a misfire state, the period in which the ion detection amount continuously becomes larger than the second combustion determination threshold value Th2 at a timing temporarily later than the second combustion detection timing Tm2 does not become longer than the second combustion determination period Tp2; thus, the diagnosis and control device 105 cannot diagnose the occurrence of a combustion state. In this case, the diagnosis and control device 105 diagnoses that the main combustion chamber 103 is in a misfire state.

The first combustion detection timing Tm1 and the second combustion detection timing Tm2 may be either one and the same or different from each other. In addition, each of the table, the map, and the calculation formula for setting the foregoing respective parameters may be set either as a common one or as a distinct one. When the table, the map, or the calculation formula is set as a common one, matching man-hours (tuning man-hours) can be reduced. When each of the table, the map, and the calculation formula is set as a distinct one, the respective combustion states of the subsidiary combustion chamber 102 and the main combustion chamber 103 can more accurately be diagnosed.

When the table, the map, or the calculation formula is set as a common one, the internal calculation of the diagnosis and control device 105 can be made common; therefore, the respective combustion states of the subsidiary combustion chamber 102 and the main combustion chamber 103 can be diagnosed at low cost.

It may be allowed that the first combustion determination threshold value Th1 and the second combustion determination threshold value Th2 is one and the same value. It may be allowed that each of the table, the map, or the calculation formula for setting the first combustion determination threshold value Th1 or the second combustion determination threshold value Th2 is set as a common one.

It may be allowed that the first combustion determination period Tp1 and the second combustion determination period Tp2 is one and the same period. It may be allowed that each of the table, the map, or the calculation formula for setting the first combustion determination period Tp1 or the second combustion determination period Tp2 is set as a common one.

In the case where the number of diagnoses (the count value) in each of which it is diagnosed that a misfire state has occurred in at least one of the subsidiary combustion chamber 102 and the main combustion chamber 103 exceeds a predetermined first counting threshold value, the diagnosis and control device 105 performs at least one of control items for increasing the load on the internal combustion engine 100, increasing the amount of a fuel to be supplied to the internal combustion engine 100, and angle advancing the timing for supplying the fuel to the internal combustion engine 100, so as to suppress the occurrence of a misfire. It may be allowed that the first counting threshold value is set to, for example, "1", and that when it is diagnosed even once that a misfire state has occurred, the foregoing control is performed. In such cases, because the misfire state is immediately canceled and hence the operation can be continued, the convenience is high.

The diagnosis and control device 105 can control the fuel injection amount and the fuel injection timing by driving the injector 107. In addition, the diagnosis and control device 105 controls the actuator 108 so as to control the throttle-valve opening degree; thus, the load on the internal combustion engine 100 can be controlled by controlling the amount of air to be supplied to the internal combustion engine 100. By use of the actuator 108 and the injector 107, the diagnosis and control device 105 can perform the control items for increasing the load on the internal combustion engine 100, increasing the amount of a fuel to be supplied to the internal combustion engine 100, and angle-advancing the timing for supplying the fuel to the internal combustion engine 100. Accordingly, occurrence of a misfire can be suppressed.

It may be allowed that in the case where the number of diagnoses (the count value) in each of which it is diagnosed that a misfire state has occurred exceeds the first counting threshold value, the diagnosis and control device 105 lights the warning lamp 109 for notifying the driver of the abnormality. Because eventually urges maintenance and replacement of the apparatus, the lighting of the warning lamp 109 is effective.

It may be allowed that in the case where the foregoing count value exceeds a predetermined second counting threshold value, the diagnosis and control device 105 performs lighting control of the warning lamp 109 for notifying the driver of the abnormality. For example, in the case where it is diagnosed that totally 20 or more misfires have occurred, the diagnosis and control device 105 lights the warning lamp 109. Because the above is the case where misfire states have continually occurred, it is effective to urge the driver to perform maintenance and replacement of the apparatus.

It may be allowed that in the case where the proportion of diagnoses in each of which it is diagnosed that a misfire state has occurred is counted and the counted proportion exceeds a predetermined proportion threshold value, the diagnosis and control device 105 performs lighting control of the warning lamp 109 for notifying the driver of the abnormality. For example, in the case where it is diagnosed that 20 misfires have occurred during 1000 ignitions, the diagnosis and control device 105 lights the warning lamp 109. Because the above is the case where misfire states have repeatedly occurred with a frequency exceeding the proportion threshold value, it is effective to urge maintenance and replacement of the apparatus.

In Embodiment 1, the control device 1 can diagnose, at low cost and in real time, a combustion state or a misfire state in at least one of the subsidiary combustion chamber and the main combustion chamber. Moreover, the diagnosis and control device 105 can restore a combustion state through appropriate feedback control for a misfire state. Alternatively, it is made possible to provide an appropriate warning to the driver. As a result, the reliability of the internal combustion engine 100 can be raised. Moreover, because discharge of an unburned fuel-air mixture can be suppressed, contribution to environmental conservation can be realized.

2. Embodiment 2

Based on the waveform of the ion detection amount, the diagnosis and control device 105 according to Embodiment 2 diagnoses whether or not preignition or abnormal combustion has occurred in any one of or both of the subsidiary combustion chamber 102 and the main combustion chamber 103. The hardware configuration of the diagnosis and control device 105 according to Embodiment 2 is the same as that of each of the diagnosis and control device 105 or the diagnosis and control device 105/the control device 106 explained in FIGS. 1 through 4 of Embodiment 1; by changing or adding only the software, a function for dealing with preignition or abnormal combustion can be realized.

<Preignition, Abnormal Combustion>

In the internal combustion engine 100, there exists a in which a fuel-air mixture is ignited regardless of the timing of ignition by the ignition plug. In some cases, when high-rotation and high-load operation of the internal combustion engine 100 continues, the heat quantity generated per unit time in each of the main combustion chamber 103 and the subsidiary combustion chamber 102 increases; thus, when touching the ignition plug, the intake valve, the exhaust valve, the piston, the combustion-chamber inner wall, or the like whose temperature has become high, a fuel-air mixture is ignited without being affected by an ignition spark. This phenomenon is referred to as preignition.

The subsidiary-chamber-type internal combustion engine 100, the time during which combustion flame stagnates in the vicinity of the electrodes of the ignition plug 302 mounted in the subsidiary combustion chamber 102 is long. The temperatures of low-heat-radiation protruding portions such as the insulator portion and the grounding electrode of the ignition plug 302 are liable to become high; preignition that starts at any of these high-temperature portions is liable to occur.

In some cases, preignition occurs before a predetermined optimum ignition timing, which generates an excessive pressure that pushes back the piston during the compression stroke. Moreover, early preignition makes combustion gas intrude into an intake system through an opened intake valve and hence may become a cause that damages a throttle valve, an air-flow sensor, an air filter, and the like.

Moreover, in some cases, late combustion caused by an ignition delay or a combustion delay due to a misfire or by an excessively late ignition timing makes a fuel-air mixture combust during the exhaust stroke, and hence the fuel-air mixture is discharged while combusting in the exhaust pipe. Such a case may become the causes of deterioration of and damage to the exhaust-gas sensor ($O_2$ sensor) or the catalyst. These phenomena are collectively referred to as abnormal combustion.

As a concept opposite to normal combustion, abnormal combustion is a concept including preignition. Accordingly, the case where ignition fails in the subsidiary combustion chamber 102 and then combustion starts with preignition in the main combustion chamber 103 is also dealt with as abnormal combustion caused by preignition.

Therefore, it is important to diagnose preignition and abnormal combustion in real time, because these may become the causes of damage to the internal combustion engine 100. An early diagnosis makes it possible to notify an operator of the misfire, for example, by lighting the warning lamp 109. As a result, because repair can be done at an early stage, the damage can be limited to a minimum. Moreover, it can be prevented beforehand that a problem is caused by a decrease in the output during travel or by becoming unable to travel.

Furthermore, diagnosis of preignition and abnormal combustion makes it possible to escape from preignition and abnormal combustion by performing the control items for decreasing the load on the internal combustion engine 100, decreasing the fuel supply amount, or angle-delaying the fuel supply timing; therefore, the diagnosis of preignition and abnormal combustion is an effective countermeasure. As a result, the reliability of the internal combustion engine 100 can be raised.

<Diagnosis of Preignition and Abnormal Combustion>

Figure 7:
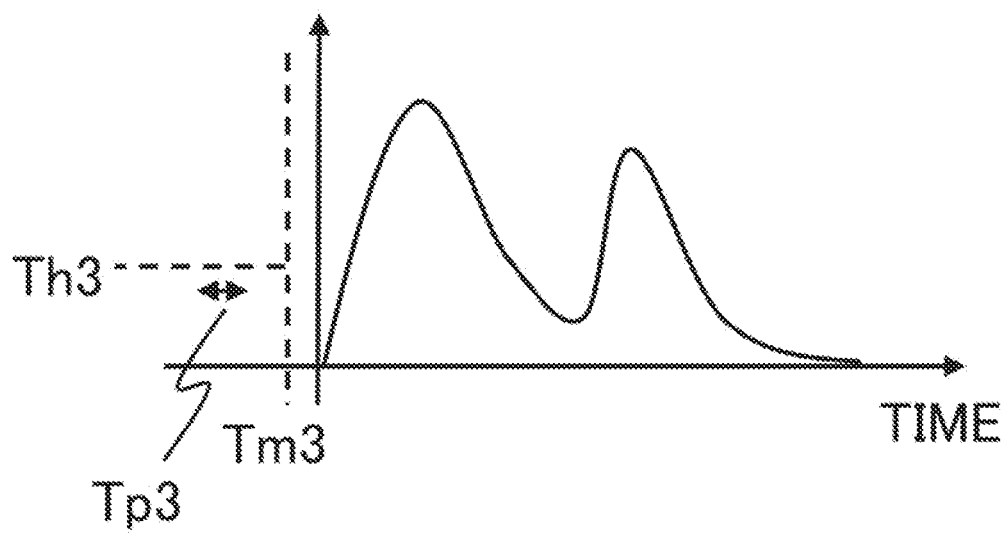
FIG. 7 is a drawing for explaining preignition according to Embodiment 2.
Figure 8:
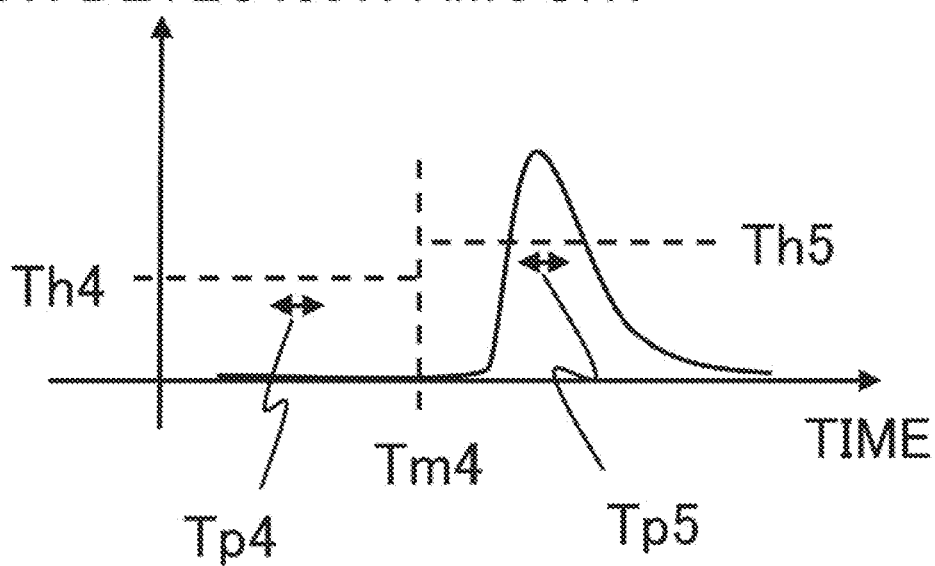
FIG. 8 is a drawing for explaining diagnosis of abnormal combustion in a main combustion chamber according to Embodiment 2.

Each of FIGS. 7 and 8 is a drawing for explaining diagnosis of combustion states in the subsidiary combustion chamber 102 and the main combustion chamber 103 according to Embodiment 2. In each of FIGS. 7 and 8, the ordinate denotes the ion detection amount, and the abscissa denotes the time. In order to represent the development of the combustion process, the abscissa may be the crank angle instead of the time. In the following explanation, the abscissa is the time; however, the explanation is established even when the time is replaced by the crank angle.

<Diagnosis of Preignition in Main Combustion Chamber or Subsidiary Combustion Chamber>

As represented in FIG. 7, in accordance with the operation condition, the diagnosis and control device 105 sets a third combustion detection timing Tm3, a third combustion determination threshold value Th3, and a third combustion determination period Tp3. It may be allowed that as the operation condition, an engine rotation speed, an engine load, a cooling-water temperature, a fuel octane value, or the like is utilized. The diagnosis and control device 105 sets the third combustion detection timing Tm3, the third combustion determination threshold value Th3, and the third combustion determination threshold value Th3 corresponding to the operation condition, by referring to a table or a map preliminarily stored in the storage apparatus 91 or by use of calculation formulas.

In the case where within a predetermined operation-condition range, the period in which the ion detection amount continuously becomes larger than the third combustion determination threshold value Th3 at a timing temporarily earlier than the third combustion detection timing Tm3 is longer than the third combustion determination period Tp3, the diagnosis and control device 105 diagnoses that a combustion state has occurred in the subsidiary combustion chamber 102 or in the main combustion chamber 103.

The graph represented by the solid line in FIG. 1 is an example showing the transition of the ion detection amount within the foregoing operation-condition range at a time when a normal combustion state has occurred. The peak indicating the first local maximum value of the ion detection amount is caused by a combustion state at a time when the ignition plug 302 ignites a fuel-air mixture in the subsidiary combustion chamber 102. In the period before and including the third combustion detection timing Tm3 prior to that timing, no large ion detection amount is shown, in general.

The case where an ion detection amount is detected in the period before and including the third combustion detection timing Tm3 suggests that preignition has occurred and combustion is under way in the subsidiary combustion chamber 102 or in the main combustion chamber 103. In the case where the period in which the on detection amount continuously becomes larger than the third combustion determination threshold value Th3 is longer than the third combustion determination period Tp3, the diagnosis and control device 105 diagnoses that preignition has occurred.

<Diagnosis of Preignition and Abnormal Combustion in Main Combustion Chamber>

As represented in FIG. 8, in accordance with the operation condition, the diagnosis and control device 105 sets a fourth combustion detection timing Tm4, a fourth combustion determination threshold value Th4, a fifth combustion determination threshold value Th5, a fourth combustion determination period Tp4, and a fifth combustion determination period Tp5. It may be allowed that as the operation condition, an engine rotation speed, a load, a cooling-water temperature, a fuel octane value, or the like is utilized. The diagnosis and control device 105 sets the fourth combustion detection timing Tm4, the fourth combustion determination threshold value Th4, the fifth combustion determination threshold value Th5, the fourth combustion determination period Tp4, and the fifth combustion determination period Tp5 corresponding to the operation condition, by referring to a table or a map preliminarily stored in the storage apparatus 91 or by use of calculation formulas.

In the case where within a predetermined operation-condition range, the period in which the ion detection amount continuously becomes larger than the fourth combustion determination threshold value Th4 at a timing earlier than the fourth combustion detection timing Tm4 is longer than the fourth combustion determination period Tp4, the diagnosis and control device 105 determines that a first condition has been established. When the first condition is not established, the diagnosis and control device 105 determines that the first condition has not been established.

In the case where within the foregoing operation-condition range, the period in which the ion detection amount continuously becomes larger than the fifth combustion determination threshold value Th5 at a timing later than the fourth combustion detection timing Tm4 is longer than the fifth combustion determination period Tp5, the diagnosis and control device 105 determines that a second condition has been established. When the second condition is not established, the diagnosis and control device 105 determines that the second condition has not been established.

When the first condition has not been established and the second condition has been established, the diagnosis and control device 105 diagnoses that preignition or abnormal combustion has occurred in the main combustion chamber 103.

The graph represented by the solid line in FIG. 8 is an example showing the transition of the ion detection amount within the foregoing operation-condition range at a time when after ignition by the ignition plug 302 cannot be performed in the subsidiary combustion chamber 102 and hence a misfire state occurs, combustion based on preignition is performed. The first peak of the ion detection value, which occurs in a normal combustion state, has not occurred at a timing prior to the fourth combustion detection timing Tm4, the diagnosis and control device 105 determines that the first condition has not been established.

In the graph represented by the solid line in FIG. 8, in the period after the fourth combustion detection timing Tm4, combustion based on preignition or abnormal combustion has occurred in the main combustion chamber 103, and a peak indicating the local maximum value of the ion detection amount has occurred. In the case where the period in which the ion detection amount continuously becomes larger than the fifth combustion determination threshold value Th5 is longer than the fifth combustion determination period Tp5, the diagnosis and control device 105 determines that the second condition has occurred.

Because the first condition has not been established and the second condition has been established, the diagnosis and control device 105 diagnoses that preignition or abnormal combustion has occurred in the main combustion chamber 103.

When diagnosing that at least one of preignition and abnormal combustion has occurred, the diagnosis and control device 105 performs at least one of the control items for decreasing the load on the internal combustion engine 100, decreasing the amount of a fuel to be supplied to the internal combustion engine 100, and angle-delaying the timing for supplying the fuel to the internal combustion engine 100. As a result, on top of preventing breakage of the internal combustion engine 100, the diagnosis and control device 105 can continue the operation of the internal combustion engine 100, while suppressing occurrence of preignition or abnormal combustion.

The diagnosis and control device 105 can control the fuel injection amount and the fuel injection timing by driving the injector 107. In addition, the diagnosis and control device 105 drives the actuator 108 so as to control the throttle-valve opening degree; thus, the load on the internal combustion engine 100 can be controlled by controlling the amount of air to be supplied to the internal combustion engine 100. By use of the actuator 107 and the injector 108, the diagnosis and control device 105 can perform the control items for decreasing the load on the internal combustion engine 100, decreasing the amount of a fuel to be supplied to the internal combustion engine 100, and angle-delaying the timing for supplying the fuel to the internal combustion engine 100. Accordingly, the diagnosis and control device 105 can suppress occurrence of a misfire.

It may be allowed that when diagnosing that at least one of preignition and abnormal combustion has occurred, the diagnosis and control device 105 performs lighting control of the warning lamp 109 for notifying the driver of the abnormality. Because eventually urges the driver to perform maintenance and replacement of the apparatus, the lighting of the warning lamp 109 is effective.

Accordingly, Embodiment 2 makes it possible that the control device 1 can diagnose, at low cost and in real time, preignition or abnormal combustion in the subsidiary combustion chamber 102 or in the main combustion chamber 103. In addition, the controller can restore a combustion state through appropriate feedback control so as to prevent breakage of the engine; concurrently, the controller 1 can urge maintenance and replacement of the apparatus by providing an appropriate warning to the driver. As a result, the reliability of the internal combustion engine 100 can be raised. Because it can raise the reliability, while making it possible that a lean fuel-air mixture in the internal combustion engine 100 stably combusts, the controller 1 can contribute to environmental conservation by raising the gasoline mileage.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number unexemplified variant examples are conceivable within the range of the technology disclosed is the present disclosure. For example, there are included the case where at least one constituent element is modified, added, or omitted and the case where at least one constituent element is extracted and then combined with constituent elements of other embodiments.

What is claimed is:

1. An internal-combustion-engine controller for controlling an internal combustion engine having
   a main combustion chamber and
   a subsidiary combustion chamber from which a combustion gas is injected into the main combustion chamber through an orifice provided between the main combustion chamber and the subsidiary combustion chamber to ignite a fuel-air mixture in the main combustion chamber, wherein the internal-combustion-engine controller has
   an ion detector that detects an ion in the in the subsidiary combustion chamber, and
   a diagnosis and control device that controls fuel supply to the internal combustion engine and diagnoses a combustion state in the main combustion chamber or in the subsidiary combustion chamber, based on an amount of an ion detected by the ion detector, wherein the diagnosis and control device diagnoses whether the main combustion chamber is in a combustion state or in a misfire state or whether the subsidiary combustion chamber is in a combustion state or in a misfire state.

2. The internal-combustion-engine controller according to claim 1, wherein the ion detector includes
   a detection probe that is disposed in the subsidiary combustion chamber and detects an ion in the in the subsidiary combustion chamber, and
   a power source that supplies a voltage for the detection probe to detect an ion and outputs a signal corresponding to the ion detection amount detected by the detection probe.

3. The internal-combustion-engine controller according to claim 2, further comprising an ignitor having
   an ignition plug that is disposed in the subsidiary combustion chamber, that has an electrode to which a high voltage is transmitted and a grounded electrode, and that causes an ignition spark to occur between the electrodes so as to make a fuel-air mixture combust, and
   an ignition coil that supplies a high voltage to the ignition plug, wherein the ignition plug plays also the role of the detection probe.

4. The internal-combustion-engine controller according to claim 3, wherein the power source is disposed in a case for the ignition coil.

5. The internal-combustion-engine controller according to claim 1,
   wherein in accordance with an operation condition of the internal combustion engine, the diagnosis and control device sets a first combustion detection timing, a first combustion determination threshold value, and a first combustion determination period, and
   wherein in the case where in a period before the first combustion detection timing, a time in which the ion detection amount continuously exceeds the first combustion determination threshold value is the same as or longer than the first combustion determination period, the diagnosis and control device diagnoses a combustion state in the subsidiary combustion chamber, and in the case where diagnosis of the combustion state is not established, the diagnosis and control device diagnoses a misfire state in the subsidiary combustion chamber.

6. The internal-combustion-engine controller according to claim 1,
wherein in accordance with an operation condition of the internal combustion engine, the diagnosis and control device sets a second combustion detection timing, a second combustion determination threshold value, and a second combustion determination period, and
wherein in the case where in a period after the second combustion detection timing, a time in which the ion detection amount continuously exceeds the second combustion determination threshold value is the same as or longer than the second combustion determination period, the diagnosis and control device diagnoses a combustion state in the main combustion chamber, and in the case where diagnosis of the combustion state is not established, the diagnosis and control device diagnoses a misfire state in the main combustion chamber.

7. The internal-combustion-engine controller according to claim 1, wherein the diagnosis and control device counts the number of diagnoses in each of which a misfire state in at least one of the main combustion chamber and the subsidiary combustion chamber has been diagnosed, and in the case where a counted value exceeds a predetermined first counting threshold value, the diagnosis and control device performs lighting control of a warning lamp.

8. The internal-combustion-engine controller according to claim 1, wherein the diagnosis and control device calculates a proportion of diagnoses in each of which a misfire state in at least one of the main combustion chamber and the subsidiary combustion chamber has been diagnosed, and in the case where a calculated proportion exceeds a predetermined proportion threshold value, the diagnosis and control device performs lighting control of a warning lamp.

9. The internal-combustion-engine controller according to claim 1, wherein the diagnosis and control device counts the number of diagnoses in each of which a misfire state in at least one of the main combustion chamber and the subsidiary combustion chamber has been diagnosed, and in the case where a counted value exceeds a predetermined second counting threshold value, the diagnosis and control device performs at least one of control items for increasing a load on the internal combustion engine, increasing a fuel supply amount, angle-advancing a fuel supply timing, and lighting a warning lamp.

10. An internal-combustion-engine controller for controlling an internal combustion engine having
a main combustion chamber and
a subsidiary combustion chamber from which a combustion gas is injected into the main combustion chamber through an orifice provided between the main combustion chamber and the subsidiary combustion chamber to ignite a fuel-air mixture in the main combustion chamber, wherein the internal-combustion-engine controller has
an ion detector that detects an ion in the in the subsidiary combustion chamber, and
a diagnosis and control device that controls fuel supply to the internal combustion engine and diagnoses a combustion state in the main combustion chamber or in the subsidiary combustion chamber, based on an amount of an ion detected by the ion detector, and
wherein the diagnosis and control device diagnoses at least one of whether or not preignition has occurred in the subsidiary combustion chamber or in the main combustion chamber and whether or not preignition or abnormal combustion has occurred in the main combustion chamber.

11. The internal-combustion-engine controller according to claim 10,
wherein in accordance with an operation condition of the internal combustion engine, the diagnosis and control device sets a third combustion detection timing, a third combustion determination threshold value, and a third combustion determination period, and
wherein in the case where in a period before the third combustion detection timing, a time in which an ion detection amount continuously exceeds the third combustion determination threshold value is the same as or longer than the third combustion determination period, the diagnosis and control device diagnoses occurrence of preignition in the subsidiary combustion chamber or in the main combustion chamber.

12. The internal-combustion-engine controller according to claim 10,
wherein in accordance with an operation condition of the internal combustion engine, the diagnosis and control device sets a fourth combustion detection timing, a fourth combustion determination threshold value, a fifth combustion determination threshold value, a fourth combustion determination period, and a fifth combustion determination period,
wherein in the case where in a period before the fourth combustion detection timing, a time in which an ion detection amount continuously exceeds the fourth combustion determination threshold value is the same as or longer than the fourth combustion determination period, the diagnosis and control device determines that a first condition has been established,
wherein in the case where in a period after the fourth combustion detection timing, a time in which an ion detection amount continuously exceeds the fifth combustion determination threshold value is the same as or longer than the fifth combustion determination period, the diagnosis and control device determines that a second condition has been established, and
wherein in the case where the first condition has not been established and the second condition has been established, the diagnosis and control device diagnoses that preignition or abnormal combustion has occurred in the main combustion chamber.

13. The internal-combustion-engine controller according to claim 10, wherein when diagnosing preignition or abnormal combustion in the main combustion chamber or in the subsidiary combustion chamber, the diagnosis and control device performs at least one of control items for decreasing a load on the internal combustion engine, decreasing a fuel supply amount, angle-delaying a fuel supply timing, and lighting a warning lamp.

* * * * *